(12) United States Patent
Rayzman et al.

(10) Patent No.: US 7,885,313 B2
(45) Date of Patent: Feb. 8, 2011

(54) METHOD AND APPARATUS FOR COOPERATIVE COEXISTENCE BETWEEN WIRELESS COMMUNICATION PROTOCOLS

(75) Inventors: Giora Rayzman, Rishon-LeZion (IL); Miri Ratner, Ramat-Gan (IL)

(73) Assignee: Intel Corporation, Santa Clara, CA (US)

( * ) Notice: Subject to any disclaimer, the term of this patent is extended or adjusted under 35 U.S.C. 154(b) by 902 days.

(21) Appl. No.: 11/800,244

(22) Filed: May 4, 2007

(65) Prior Publication Data

US 2008/0273575 A1    Nov. 6, 2008

(51) Int. Cl.
 *H04B 1/69* (2006.01)
 *H04B 1/713* (2006.01)
(52) U.S. Cl. ...................... 375/132; 375/220
(58) Field of Classification Search ............ 375/132, 375/133, 137, 138, 144, 232
See application file for complete search history.

(56) References Cited

U.S. PATENT DOCUMENTS

2008/0045152 A1*  2/2008  Boes ................... 455/63.1
2008/0205487 A1*  8/2008  Hu et al. ............... 375/132
2008/0219323 A1*  9/2008  Desai et al. ............ 375/132

* cited by examiner

*Primary Examiner*—Chieh M Fan
*Assistant Examiner*—Qutbuddin Ghulamali
(74) *Attorney, Agent, or Firm*—Cool Patent, P.C.; Joseph P. Curtin

(57) ABSTRACT

A method and apparatus of reducing interference between subsystems implementing wireless communication protocols is disclosed. The method comprises reducing interference in a first subsystem implementing a first wireless communication protocol operating in a first frequency band caused by a second subsystem implementing a second wireless communication protocol operating in a second frequency band, the second wireless communication protocol employing Adaptive Frequency Hopping (AFH), the method comprising calculating one or more frequencies to be avoided by the second subsystem on the basis of one or more frequencies in use by the first subsystem.

21 Claims, 4 Drawing Sheets

METHOD AND APPARATUS FOR COOPERATIVE COEXISTENCE BETWEEN WIRELESS COMMUNICATION PROTOCOLS

FIELD OF THE INVENTION

The present invention relates generally to cooperative coexistence between wireless communication protocols used by wireless communication devices. In particular, the invention relates to reducing interference between two or more different wireless communication protocols.

BACKGROUND OF THE INVENTION

The Institute of Electrical and Electronics Engineers (IEEE) 802.16 standard family of communications protocols, such as 802.16d, 802.16e and other variants, commonly referred to as WiMAX (Worldwide Interoperability for Microwave Access), works, amongst other frequency bands, in licensed frequency bands, such as 2.3-2.4 GHz and 2.5-2.69 GHz. In some geographical regions/regulatory domains, the WiMAX frequency bands are in close proximity to the 2.4 GHz Bluetooth Industry Scientific and Medical (ISM) band. Consequently, there is considerable residual interference between WiMAX and Bluetooth (victim) and between Bluetooth and WiMAX (victim), which impedes normal reception of the victim technology when the other interfering technology is transmitting. Whilst in some environments, such as laptop platforms, antennae separation between WiMAX and Bluetooth may be relatively high, for example >18 dB, this separation is still not high enough to completely mitigate the interference.

In Bluetooth specification 1.2 and later specifications, Adaptive Frequency Hopping (AFH) is used to improve the performance of physical links in the presence of interference as well as reducing the interference caused by physical links on other devices in the ISM band of 2.4 GHz. When Bluetooth operates in AFH mode, only a subset of all available Bluetooth frequencies is used by the Bluetooth Master and the Bluetooth Slave. When the Bluetooth Master senses interference in the 2.4 GHz ISM band, it adjusts the set of frequencies to use accordingly. Bluetooth devices that support AFH can operate on as few as 20 out of a total of 79 available frequencies when restricted by AFH.

Some Bluetooth chipset manufacturers provide programmatic means of controlling the set of frequencies to be skipped or used by AFH. Solutions exist for delivering some of the operational frequency information to the Bluetooth component.

BRIEF DESCRIPTION OF THE DRAWINGS

In order that the invention may be readily understood and put into practical effect, reference now will be made to embodiments of the present invention with reference to the accompanying drawings, wherein like reference numbers refer to identical elements. The drawings are provided by way of example only, wherein.

Figure 1:
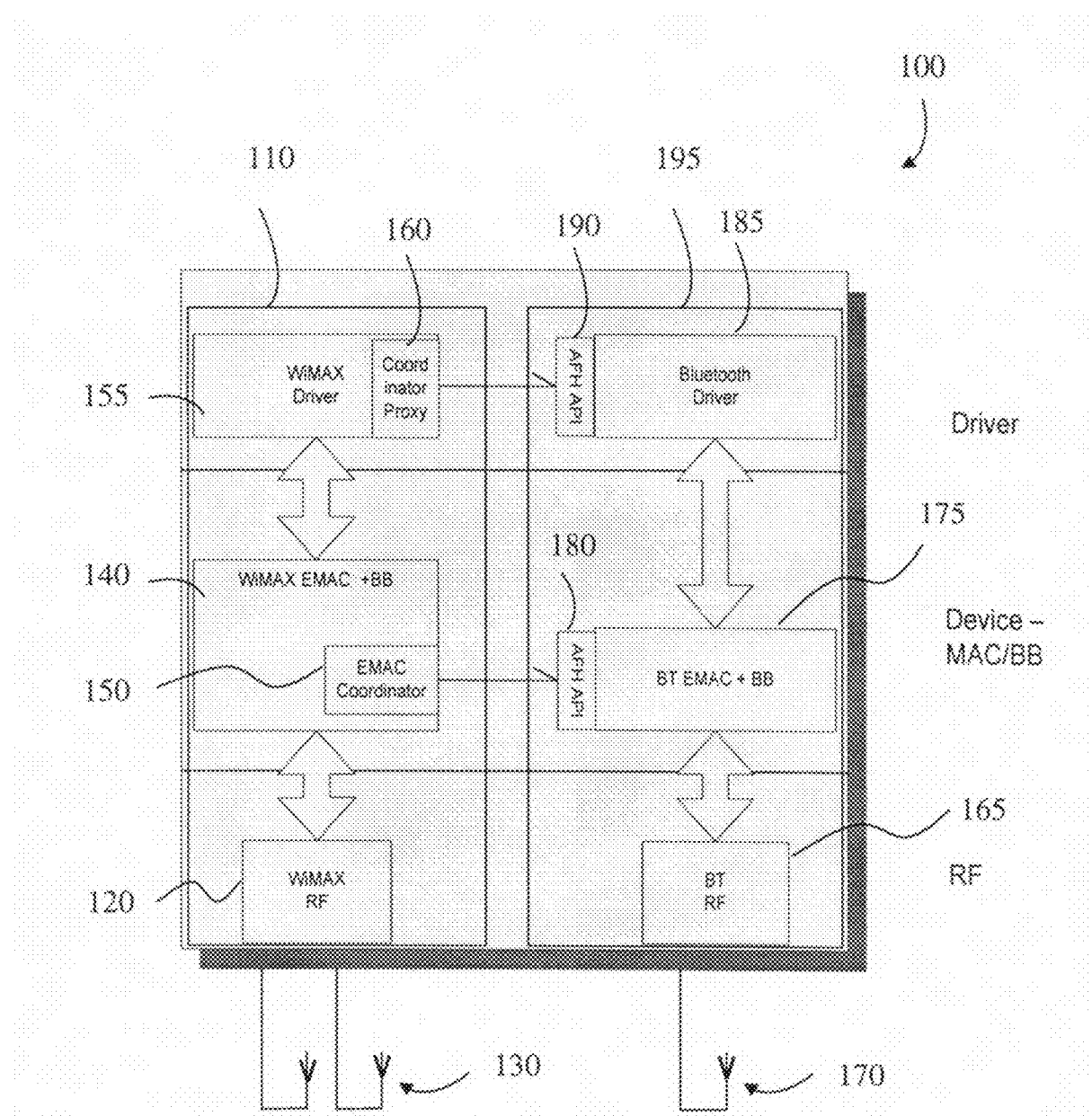
FIG. 1 is a schematic diagram illustrating an apparatus for reducing interference between subsystems implementing different wireless communication protocols according to some embodiments of the present invention.

Skilled addressees will appreciate that elements in the figures are illustrated for simplicity and clarity and have not necessarily been drawn to scale. For example, the relative dimensions of some of the elements in the figures may be distorted to help improve understanding of embodiments of the present invention.

DETAILED DESCRIPTION

Before describing embodiments that are in accordance with the present invention in detail, it should be understood that the embodiments reside primarily in combinations of method steps and apparatus components related to reducing interference between two or more subsystems implementing different wireless communication protocols. Accordingly, the apparatus components and method steps have been represented where appropriate by conventional symbols in the drawings, showing only those specific details that are relevant to understanding the embodiments of the present invention such that the disclosure is not obscured with details that will be readily apparent to those of ordinary skill in the art.

In this specification, the terms "comprises," "comprising," "includes", "including" or any other variation thereof, are intended to cover a non-exclusive inclusion, such that a method, process, article or apparatus that comprises a list of elements does not include only those elements, but may include other elements not expressly listed or inherent to such method, process, article or apparatus. An element preceded by, for example, "comprises a . . . " does not, without more constraints, preclude the existence of additional identical elements in the method, process, article or apparatus that comprises the element.

It will be appreciated that embodiments of the invention herein described may be comprised of one or more conventional processors and unique stored program instructions that control the one or more processors to implement, in conjunction with certain non-processor circuits, some, most, or all of the functions of reducing interference between two or more subsystems implementing different wireless communication protocols as herein described. The non-processor circuits may include, but are not limited to, a radio receiver, a radio transmitter, signal drivers, clock circuits, power source circuits, and user input devices. As such, these functions may be interpreted as a method for reducing interference between two or more wireless communication protocols. Alternatively, some or all functions could be implemented by a state machine that has no stored program instructions, or in one or more application specific integrated circuits (ASICs), Field-Programmable Gate Arrays (FPGAs), or other dedicated circuitry, in which each function or one or more combinations of the functions are implemented as custom logic. A combination of the two approaches could also be used. Thus, methods and means for these functions have been described herein. Further, it is expected that one of ordinary skill in the art, when guided by the disclosure herein, will be readily capable of generating such software instructions, programs and integrated circuits with minimal experimentation.

With reference to FIG. 1 and in accordance with embodiments of the present invention, a schematic diagram illustrates an apparatus 100 for reducing interference between subsystems implementing different wireless communication protocols that are simultaneously in operation. Embodiments of the present invention can be implemented in, and are applicable to, wireless communication devices, such as, but not limited to, mobile telephones, notebook or laptop computers, personal digital assistants (PDAs), portable multimedia devices, mobile internet devices (MIDs), ultra mobile PC (UMPCs), ultra mobile devices (UMDs) and other wireless communication devices.

According to some embodiments, apparatus 100 comprises a first subsystem 110 that implements a first wireless communication protocol. The first subsystem 110 comprises a first radio frequency (RF) transmitter/receiver 120 coupled to be in communication with a pair of antennae 130 for the first wireless communication protocol. In alternative embodiments, a single antenna or more than two antennae can be provided. The first radio frequency (RF) transmitter/receiver 120 is coupled to be in communication with a first Embedded Media Access Control (EMAC) and baseband (BB) module 140, which comprises an EMAC coordinator 150. The first module 140 is coupled to be in communication with a first driver 155, which in some embodiments comprises a coordinator proxy 160. The coordinator proxy 160 is only required in which direct communication between the first subsystem 110 and another subsystem implementing a different wireless communication protocol is not possible. In alternative embodiments, the EMAC coordinator 150 can be provided in the first driver 155 and the coordinator proxy 160 can be dispensed with. According to this embodiment, the first wireless communication protocol is WiMAX.

Apparatus 100 further comprises a second subsystem 195 that implements a second wireless communication protocol. The second subsystem 195 comprises a second radio frequency (RF) transmitter/receiver 165 coupled to be in communication with an antenna 170 for the second wireless communication protocol. In alternative embodiments, instead of a separate antenna 170 being provided, the second radio frequency (RF) transmitter/receiver 165 can share the one or more antennae 130. The second radio frequency (RF) transmitter/receiver 165 is coupled to be in communication with a second Embedded Media Access Control (EMAC) and baseband (BB) module 175, which comprises, or is coupled to, an Adaptive Frequency Hopping (AFH) interface 180. According to various embodiments, interface 180 can be an application program interface (API) or a communication protocol interface implemented with physical wiring, shared memory, dual-ported memory or the like. The second module 175 is coupled to be in communication with a second driver 185, which in some embodiments comprises, or is coupled to, an Adaptive Frequency Hopping (AFH) interface 190. In this embodiment, interface 190 is in the form of an application program interface (API), but the interface 190 can alternatively be a communication protocol interface implemented with physical wiring, shared memory, dual-ported memory or the like. In this embodiment, the EMAC coordinator 150 of the first module 140 is coupled to be in communication with the Adaptive Frequency Hopping (AFH) application program interface (API) 180. Where communication between the subsystems at the device level is not possible, the coordinator proxy 160 of the first driver 155 is coupled to be in communication with the Adaptive Frequency Hopping (AFH) application program interface (API) 190 of the second driver 185. According to this embodiment, the second wireless communication protocol is Bluetooth.

It will be appreciated that whilst FIG. 1 illustrates the first and second subsystems 110, 195 provided in a single apparatus 100, the first and second subsystems 110, 195 can be implemented in separate devices. Hence, embodiments of the present invention are applicable to reducing interference between subsystems that are provided within a single device or within multiple devices.

Figure 2:
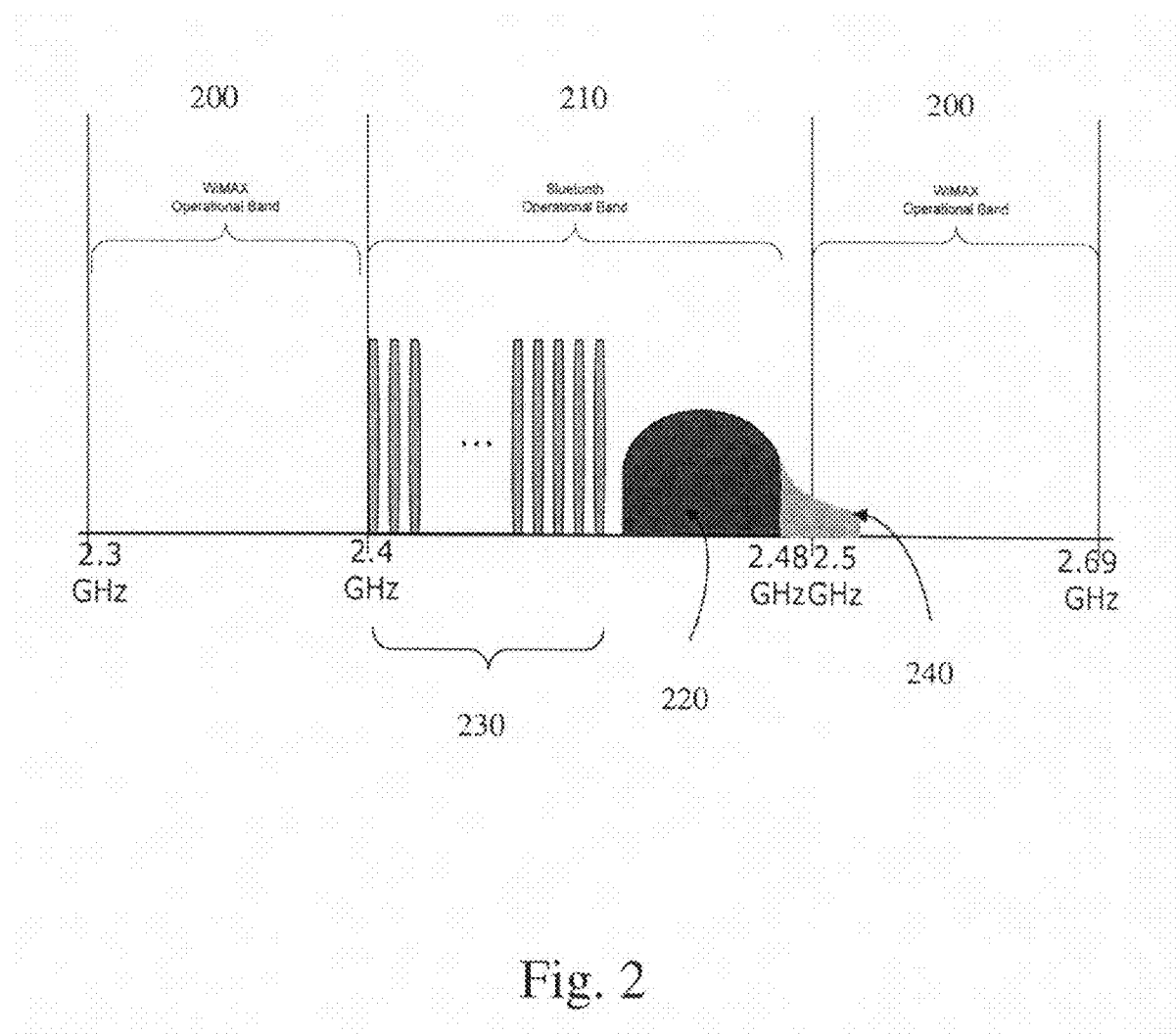
FIG. 2 shows a frequency spectrum illustrating a method for reducing interference between subsystems implementing different wireless communication protocols according to an embodiment of the present invention.

With reference to FIG. 2, the first subsystem 110 implements the first wireless communication protocol operating in a first frequency band 200 and the second subsystem 195 implements a second wireless communication protocol operating in a second frequency band 210. The second wireless communication protocol employs Adaptive Frequency Hopping (AFH). Embodiments of the present invention provide a method and apparatus of reducing interference in the first subsystem 110 caused by the second subsystem 195 by calculating one or more frequencies to be avoided by the second subsystem 195 on the basis of one or more frequencies in use by the first subsystem 110. Thus, interference the second subsystem 195 may cause to the first subsystem 110 is reduced by not operating in the one or more frequencies currently utilized by the first wireless communication protocol. As shown schematically in FIG. 2, the one or more frequencies to be avoided by the second subsystem 195 form a frequency mask or map 220 of prohibited frequencies that are avoided by the AFH employed by the second wireless communication protocol. The remaining frequencies 230 are utilized by the second subsystem 195 employing the AFH method. FIG. 2 includes region 240, which represents the residual interference that occurs when the second wireless subsystem, implementing the second communication protocol, uses the frequencies, corresponding to region 220, in the second frequency band 210. The residual interference is minimized by virtue of the frequency mask 220.

Embodiments of the present invention also can reduce interference in the second subsystem 195 that may be caused by the first subsystem 110 operating in the one or more frequencies utilized by the second wireless communication protocol.

The EMAC coordinator 150 of the first subsystem 110 calculates one or more frequencies to be avoided by the second subsystem 195 on the basis of one or more frequencies in use by the first subsystem 110. According to some embodiments, the one or more frequencies to be avoided by the second subsystem 195 are calculated on the basis of a frequency separation between the one or more frequencies in use by the first subsystem 110 and the one or more frequencies in use by the second subsystem 195.

According to other embodiments, calculation of the one or more frequencies to be avoided by the second subsystem 195 is on the basis of an isolation between at least one of the antennae 130 used for the first subsystem 110 and at least one antenna 170 used for the second subsystem 195, the isolation being known a priori and/or stored in a configuration description, such as a file, EEPROM, FLASH, or other memory, for the specific platform in which the invention is implemented.

In alternative embodiments, calculation of the one or more frequencies to be avoided by the second subsystem 195 is on the basis of signal quality. The method can include measuring the quality of the signal in the frequencies required for the wireless communication protocol and calculating the frequency mask 220 used for AFH such that only the frequencies above a predetermined threshold signal quality are utilized.

In yet further embodiments, calculation of the one or more frequencies to be avoided by the second subsystem 195 can be on the basis of one or more of the following: special detection or sensing of media status and/or conditions; prior configurations between subsystems; remote requests. The special detection or sensing of media status and/or conditions can include measuring factors such as packet loss rates, error rates, number of retransmissions and other such parameters from the physical and media access control (MAC) layers. In other embodiments, frequencies outside the frequency band 200 for the first wireless communication protocol can be scanned for patterns in the physical layer. The use of prior configurations between subsystems can benefit from previous good configurations in order to speed up the calculation of the frequency mask 220 in subsequent calculations. Regarding the utilization of remote requests, the remote request can be from the subsystem to a remote server or application, such as the platform or a base station that stores, for example, more sophisticated frequency allocation algorithms or the isolation parameters. In response to the request, the isolation parameters, frequency mask for AFH or other data in communicated to the requesting subsystem.

The EMAC coordinator 150 of the first subsystem 110 communicates the one or more frequencies to be avoided by the second subsystem 195 to the Adaptive Frequency Hopping (AFH) application program interface (API) 180 of the second subsystem 195.

In situations in which communication cannot occur at the device level (Media Access Control/Baseband (MAC/BB) level) of the apparatus 100, or between multiple devices, the coordinator proxy 160 of the first driver 155 and the interface 190 of the second driver 185 are provided. The coordinator proxy 160 receives the one or more frequencies to be avoided by the second subsystem 195 from the EMAC coordinator 150 and communicates the one or more frequencies to be avoided to the AFH interface 190 of the second driver 185.

Embodiments of the present invention include re-calculating the one or more frequencies to be avoided by the second subsystem 195 when a new regulatory domain is encountered in which the first frequency band and/or the second frequency band change. For example, consider the apparatus 100 located in a first regulatory domain in which the first frequency band for the first wireless communication protocol is 2.5-2.69 GHz. If the apparatus 100 is moved to a second regulatory domain in which the first frequency band for the first wireless communication protocol is 2.3 GHz, the present invention automatically re-calculates the one or more frequencies to be avoided by the second subsystem 195 without the need for user intervention.

Figure 3:
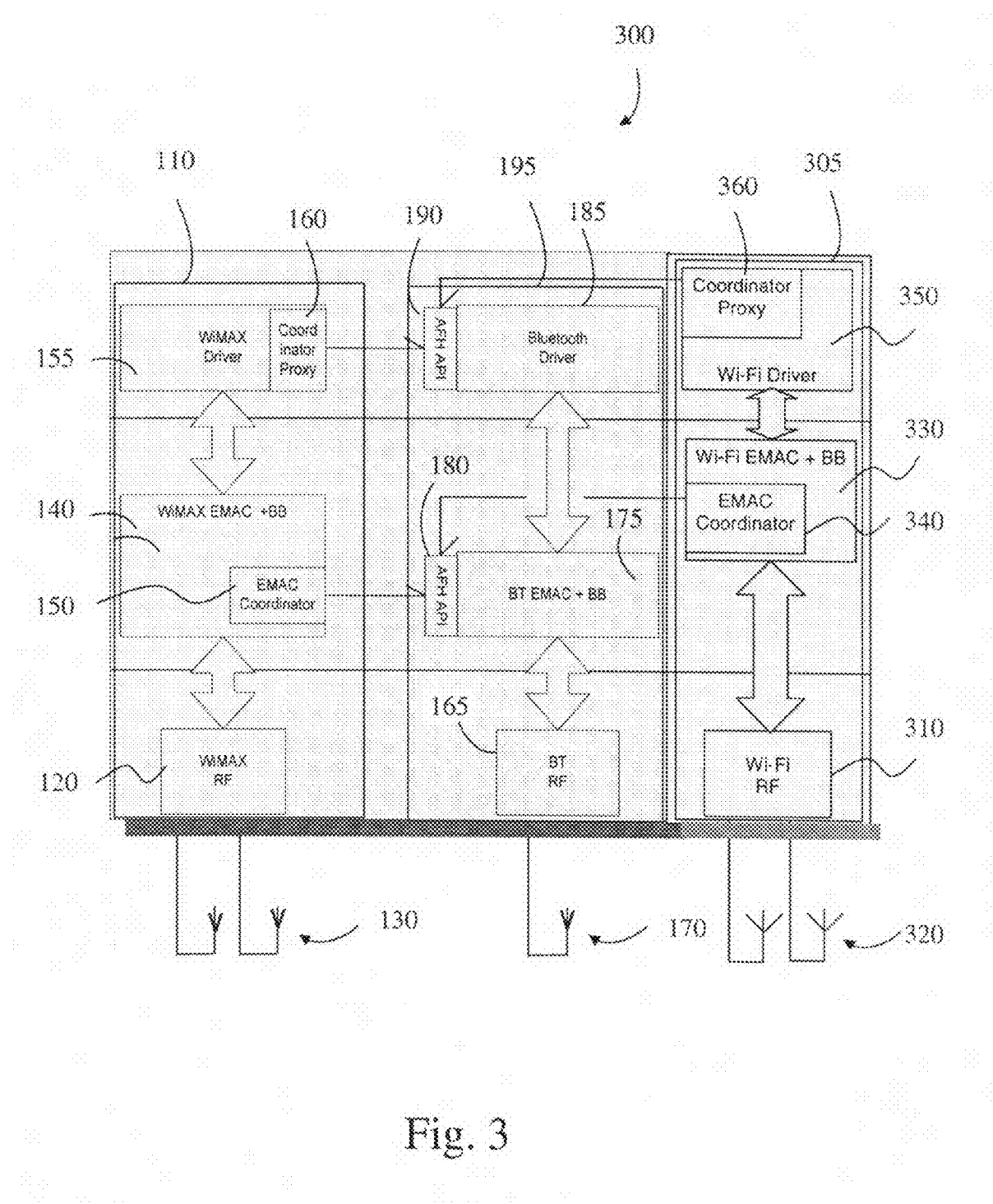
FIG. 3 is a schematic diagram illustrating an apparatus for reducing interference between subsystems implementing different wireless communication protocols according to alternative embodiments of the present invention.

With reference to FIG. 3, according to some embodiments of the present invention, the apparatus 300 comprises first and second subsystems 110, 195 as described above and a third subsystem 305 that implements a third wireless communication protocol. The third subsystem 305 comprises a third radio frequency (RF) transmitter/receiver 310 coupled to be in communication with a pair of antennae 320 for a third wireless communication protocol. In alternative embodiments, a single antenna or more than two antennae can be employed. In some embodiments, a set of antennae common to all subsystems 110, 195, 305 or devices can be provided and one or more of the antennae can be statically or dynamically assigned to each subsystem as required. The third radio frequency (RF) transmitter/receiver 310 is coupled to be in communication with a third Embedded Media Access Control (EMAC) and baseband (BB) module 330, which comprises an EMAC coordinator 340. The third module 330 is coupled to be in communication with a third driver 350, which, according to some embodiments, comprises a coordinator proxy 360. According to this embodiment, the third wireless communication protocol is Wi-Fi.

Although FIG. 3 shows the first, second and third subsystems 110, 195, 305 implemented in a single apparatus 100, it will be appreciated that the subsystems 110, 195, 305 can be implemented in separate devices or any two of the subsystems implemented in a first device and the other subsystem implemented in a second device.

According to some embodiments of the present invention, the method further comprises reducing interference between the third subsystem 305 implementing the third wireless communication protocol operating in the second frequency band or a third frequency band and the first and second subsystems 110, 195. The method further comprises calculating one or more additional frequencies to be avoided by the second subsystem 195 to avoid interference in the third subsystem 305. According to one embodiment, the first wireless communication protocol is WiMAX, the second wireless communication protocol is Bluetooth and the third wireless communication protocol is Wi-Fi.

Whilst calculation of the frequencies to be avoided can be performed by either or both of the EMAC coordinators 150, 340 of the subsystems 110, 305, whether located in the modules 140, 330 respectively or the drivers 155, 350 respectively, it should be appreciated that calculation of the frequencies to be avoided can be performed by a separate entity, such as one residing within the platform in which the devices reside. In alternative embodiments, the calculations required to reduce interference in both the first and third subsystems 110, 305 can be performed by the EMAC coordinator 150 of the first subsystem 110 or the EMAC coordinator 340 of the third subsystem 305.

Figure 4:
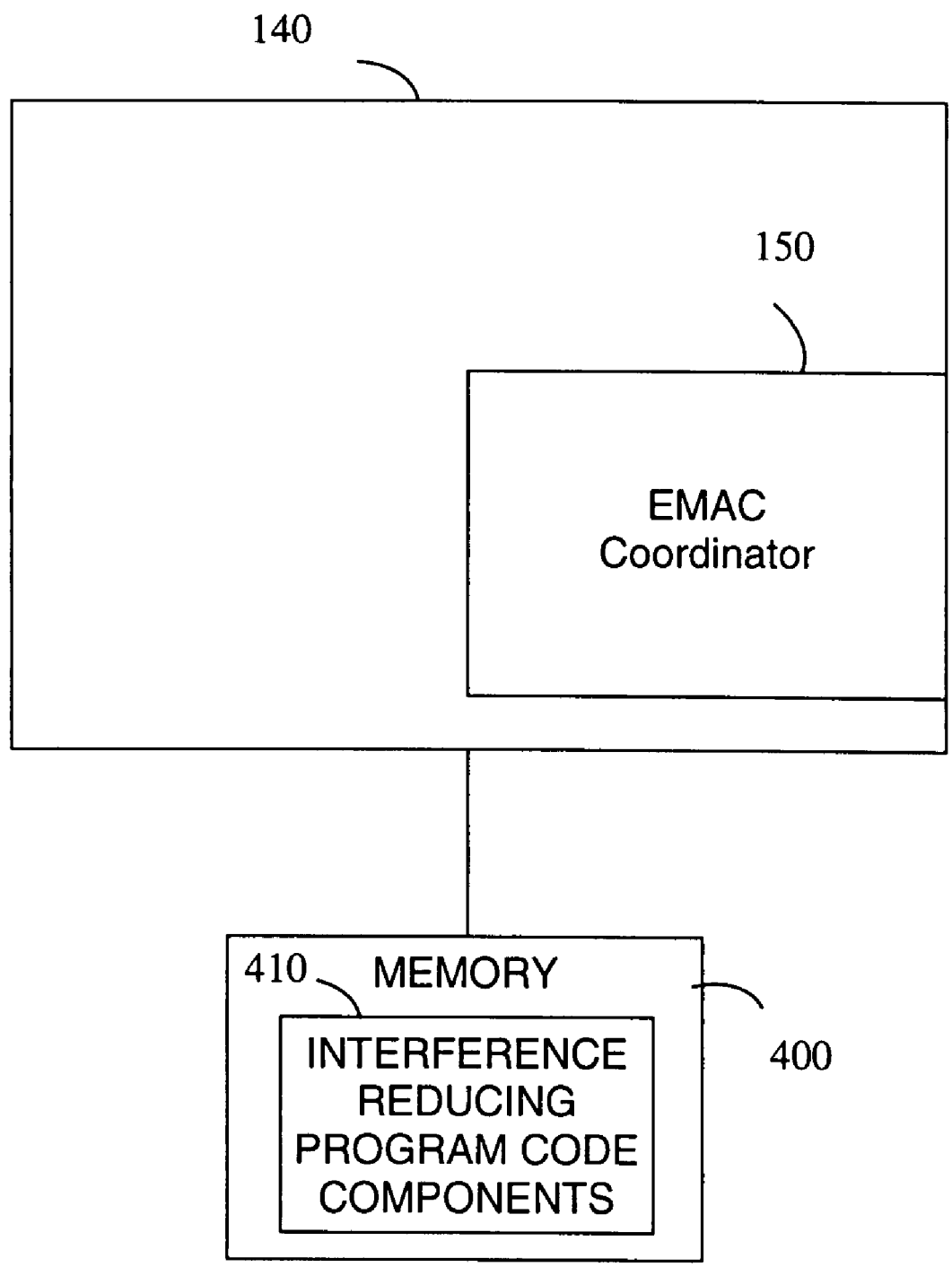
FIG. 4 a schematic diagram illustrating components of the apparatus according to alternative embodiments of the present invention.

Referring to FIG. 4, a schematic diagram illustrates some of the components of the apparatus 100 according to some embodiments of the present invention. As described above, one or more apparatus 100 comprises one or more modules 140, 175, 330, each of which can be in the form of a processor, such as a standard microprocessor, ASIC, FPGA or the like for implementing the method as described herein. For example, module 140 can be operatively coupled to a storage medium in the form of a memory 400. The memory 400 comprises a computer-readable medium such as a random access memory (e.g, static random access memory (SRAM), or synchronous dynamic random access memory (SDRAM)), read only memory (e.g., programmable read only memory (PROM), or electrically erasable programmable read only memory (EEPROM)), or hybrid memory (e.g., FLASH), or other types of memory suitable for the said type of storage, as is well known in the art. The computer-readable medium comprises computer readable program code components 410 for reducing interference between subsystems implementing wireless communication protocols in accordance with the teachings of the present invention, at least some of which are selectively executed by the module 140 and are configured to cause the execution of the method described herein.

Advantages of the various embodiments of the present invention thus include the reduction of interference between simultaneously operating subsystems 110, 195, 305 implementing different wireless communication protocols thus avoiding degradation of voice quality in voice calls and a reduction in data transfer rates. By virtue of calculating one or more frequencies to be avoided by the second subsystem 195 on the basis of one or more frequencies in use by the first subsystem 110, interference of the first subsystem 110 and consequently the second subsystem 195 is at least reduced if not avoided altogether. Embodiments of the present invention enable, for example, a Voice over Internet Protocol (VoIP) call over the WiMAX wireless communication protocol while the Bluetooth wireless communication protocol is used to connect the same device to a wireless headset.

According to some embodiments of the present invention, interference can be reduced between a third subsystem 305 implementing a third wireless communication protocol, such as Wi-Fi, operating in the second or third frequency bands and the first and second subsystems 110, 195 allowing three different wireless communication protocols to be used simultaneously.

Embodiments of the present invention provide an efficient and straightforward solution for reducing interference between subsystems implementing different wireless communication protocols with minimal modifications to the subsystems. Furthermore, embodiments of the present invention provide automatic adaptation to new regulatory domains such that interference between the subsystems is avoided when the device(s) in which the invention is implemented is used in different countries or regulatory regions in which the frequency band for one or more of the wireless communication protocols may be different.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

What is claimed is:

1. A method, comprising:
reducing interference in a first subsystem implementing a first wireless communication protocol operating in a first frequency band caused by a second subsystem implementing a second wireless communication protocol operating in a second frequency band, the second wireless communication protocol employing Adaptive Frequency Hopping, the method comprising calculating one or more prohibited frequencies in the second frequency band that are avoided by the second subsystem when the second subsystem operates in the second frequency band based on one or more frequencies in the first frequency band that are in use by the first subsystem, and based on a frequency separation between the one or more frequencies in the first frequency band that are in use by the first subsystem and the one or more frequencies in the second frequency band that are in use by the second subsystem; and
avoiding by the second subsystem the one or more prohibited frequencies in the second frequency band as the second subsystem operates in the second frequency band.

2. The method of claim 1, further comprising:
calculating the one or more prohibited frequencies in the second frequency band that are avoided by the second subsystem when the second subsystem operates in the second frequency band on the basis of an isolation between at least one antenna used for the first subsystem and at least one antenna used for the second subsystem.

3. The method of claim 1, further comprising:
calculating the one or more prohibited frequencies in the second frequency band that are avoided by the second subsystem when the second subsystem operates in the second frequency band on the basis signal quality; special media detection; prior configuration; or remote request.

4. The method of claim 1, further comprising:
re-calculating the one or more prohibited frequencies in the second frequency band that are avoided by the second subsystem when the second subsystem operates in the second frequency band when a new regulatory domain is encountered in which the first frequency band and/or the second frequency band change.

5. The method of claim 1, wherein the first wireless communication protocol is WiMAX and the second wireless communication protocol is Bluetooth.

6. The method of claim 1, further comprising:
reducing interference between a third subsystem implementing a third wireless communication protocol operating in the second frequency band or in a third frequency band and the first and second subsystems.

7. The method of claim 5, wherein the first wireless communication protocol is WiMAX, the second wireless communication protocol is Bluetooth and the third wireless communication protocol is Wi-Fi.

8. The method of claim 1, wherein the method is performed at a driver level.

9. The method of claim 6, further comprising:
calculating one or more additional prohibited frequencies in the second frequency band that are avoided by the second subsystem when the second subsystem operates in the second frequency band to avoid interference in the third subsystem.

10. The method of claim 1, wherein the method is performed at a Media Access Control/Baseband level.

11. An article comprising: a non-transitory computer-readable medium having stored thereon instructions that, if executed, result in at least the following:
reducing interference in a first subsystem implementing a first wireless communication protocol operating in a first frequency band caused by a second subsystem implementing a second wireless communication protocol operating in a second frequency band, the second wireless communication protocol employing Adaptive Frequency Hopping, by calculating one or more prohibited frequencies in the second frequency band that are avoided by the second subsystem when the second subsystem operates in the second frequency band based on one or more frequencies in the first frequency band that are in use by the first subsystem, and based on a frequency separation between the one or more frequencies in the first frequency band that are in use by the first subsystem and the one or more frequencies in the second frequency band that are in use by the second subsystem; and
avoiding by the second subsystem the one or more prohibited frequencies in the second frequency band as the second subsystem operates in the second frequency band.

12. The article of claim 11, further comprising calculating the one or more prohibited frequencies in the second frequency band that are avoided by the second subsystem when the second subsystem operates in the second frequency band on the basis of an isolation between at least one antenna used for the first subsystem and at least one antenna used for the second subsystem.

13. The article of claim 11, further comprising calculating the one or more prohibited frequencies in the second frequency band that are avoided by the second subsystem when the second subsystem operates in the second frequency band on the basis of signal quality; special media detection; prior configuration; or remote request.

14. The article of claim 11, further re-calculating the one or more prohibited frequencies in the second frequency band that are avoided by the second subsystem when the second subsystem operates in the second frequency band when a new regulatory domain is encountered in which the first frequency band and/or the second frequency band change.

15. The article of claim 11, wherein the first wireless communication protocol is WiMAX and the second wireless communication protocol is Bluetooth.

16. The article of claim 11, further comprising reducing interference between a third subsystem implementing a third wireless communication protocol operating in a third frequency band and the first and second subsystems.

17. The article of claim 16, further comprising calculating one or more additional prohibited frequencies in the second frequency band that are avoided by the second subsystem when the second subsystem operates in the second frequency band to avoid interference in the third subsystem.

18. The article of claim 16, wherein the first wireless communication protocol is WiMAX, the second wireless communication protocol is Bluetooth and the third wireless communication protocol is Wi-Fi.

19. The article of claim 11, wherein the instructions stored on the computer-readable medium are executed at a Media Access Control/Baseband level.

20. The article of claim 19, wherein the one or more prohibited frequencies in the second frequency band that are avoided that are calculated in the Media Access Control/Baseband level are communicated to a driver level of a host.

21. A device to reduce interference in a first subsystem implementing a first wireless communication protocol operating in a first frequency band caused by a second subsystem implementing a second wireless communication protocol operating in a second frequency band, the second wireless communication protocol employing Adaptive Frequency Hopping, the device comprising:
  a processor capable of calculating one or more prohibited frequencies in the second frequency band that will be avoided by the second subsystem when the second subsystem operates in the second frequency band based on one or more frequencies in the first frequency band that are in use by the first subsystem; and
  a non-transitory computer-readable medium coupled to the processor, the non-transitory computer-readable medium storing therein instructions that, when executed by the processor, result in calculation of the one or more prohibited frequencies in the second frequency band that will be avoided by the second subsystem when the second subsystem operates in the second frequency band based on the one or more frequencies in the first frequency band that are in use by the first subsystem, and based on a frequency separation between the one or more frequencies in the first frequency band that are in use by the first subsystem and the one or more frequencies in the second frequency band that are in use by the second subsystem; and
  result in the second subsystem avoiding the one or more prohibited frequencies in the second frequency band as the second subsystem operates in the second frequency band.

* * * * *